May 1, 1928.

P. J. NOEL

TOOTHBRUSH

Filed April 30, 1927

1,668,216

Inventor
P. J. Noel.

By Mason Fenwick & Lawrence
Attorneys

Patented May 1, 1928.

1,668,216

UNITED STATES PATENT OFFICE

PHILIP JORDAN NOEL, OF BOWLING GREEN, KENTUCKY.

TOOTHBRUSH.

Application filed April 30, 1927. Serial No. 188,009.

This invention relates to improvements in tooth brushes, particularly in a tooth brush which will provide means for cleaning both the upper and lower teeth at the same instant.

An object of this invention to provide a tooth brush having a plurality of cleaning surfaces integrally attached together in such a manner that the upper and lower outer walls of the teeth may be cleaned at the same moment and by reversing the cleaning surfaces the cutting edges, together with much of the outer and inner wall of the teeth, may be cleaned at the same instant.

Another object of this invention is to provide a teeth cleaning device comprising a plurality of sections adapted to be foldably arranged in relationship to each other in such a manner that both the upper and lower rows of teeth may be thoroughly cleaned at the same time, including the outer walls of the teeth, when the device is folded in one position; and the cutting edges of the teeth, together with certain portions of the outer and inner surfaces, will be thoroughly cleaned when folded in another position.

Other objects of this invention will appear from the following detailed description of the device and as disclosed in the single sheet of drawings which is herewith made a part of this application.

In the drawings—

Figure 1:
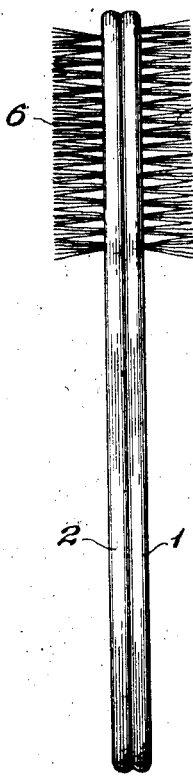
Figure 1 represents a side elevational view of the teeth cleaning device, the different sections thereof being folded to provide means for thoroughly cleaning the cutting edges of the teeth in both the upper and lower jaws.
Figure 2:
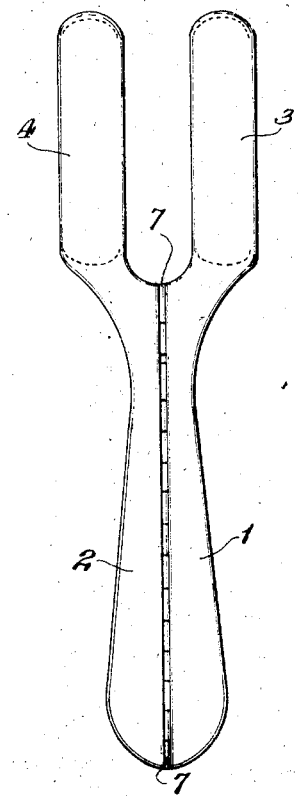
Figure 2 illustrates a vertical rear elevational view of the tooth cleaning device disclosing the different elements thereof in unfolded position for providing brushing surfaces for thoroughly cleaning the outer wall of the teeth on both the upper and lower jaws.
Figure 4:
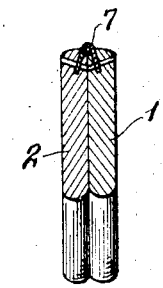
Figure 4 represents a sectional view of the shank of the tooth cleaning device, the different elements being in folded relationship and disclosing the hinged means for bringing the elements into foldable relationship to each other.

Numerals 1 and 2 designate shank portions made of material common to handles for tooth brushes and the like, the portions 1 and 2 having extensions 3 and 4 properly spaced apart and formed for the purpose of receiving bristle elements 5 and 6 common to tooth brushes and the like. The tooth cleaning device, according to this invention, is so arranged that the shank portions 1 and 2 may be brought into foldable relationship to each other by means of any suitable device, such as hinges 7, it being understood that various types of pivotally arranged elements may be used in this connection without affecting the merits of the invention. The shank extensions 3 and 4 are spaced apart and so shaped that when in the unfolded position as disclosed in Figure 2, the cleaning bristles 5 and 6 may be readily applied to both the upper and lower outer walls of the teeth at the same instant, thereby making it possible to clean the upper and lower teeth by the same sweep of the hand as it holds the shank portions 1 and 2 of the device. The cutting edges of the teeth, including the upper and lower grinders, and a portion of the outer and inner surfaces may be thoroughly cleaned by folding the elements in the relationship disclosed in Figure 1, wherein the bristles 5 and 6 may be vigorously applied by a single sweep of the hand.

Figure 5:
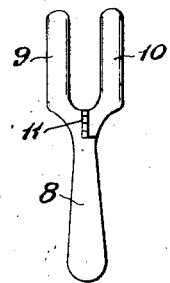
Figure 5 represents one modification of this invention disclosing a simplified form for bringing the sections into foldable relationship.
Figure 3:
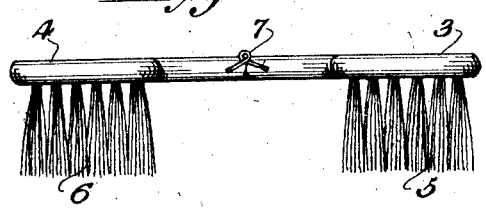
Figure 3 represents an end elevational view of Figure 2 to an enlarged scale, disclosing the brushing or cleaning elements of the device in the position they would be for the purpose of thoroughly cleaning the upper and lower outer walls of the teeth at the same instant.

The modification of this invention disclosed in Figure 5 calls for shank portion 8 and an extension 9 for receiving suitable bristle portions for brushing the teeth. A cooperating extension element 10 is pivotally mounted to the shank portion 8 as at 11 by any suitable means, whereby the two extension portions 9 and 10 carrying teeth cleaning bristles may be arranged in operative relationship similar to the disclosures in Figures 1 and 2.

In operation this tooth brush provides an efficient and speedy means for cleaning the upper and lower outer walls of the teeth and the cutting and grinder edges thereof at the same instant. The outer walls of the teeth may be cleaned thoroughly by arranging the foldable elements in the position disclosed in Figures 2 and 5, while the cutting or grinder edges of the teeth may be cleaned by arranging the elements of the device in the relationship disclosed in Figure 1.

It is to be understood that substitutions and alterations may be made in the above disclosure, within the scope of the claim, without in any manner affecting the merits of this invention.

What I claim is:—

A tooth brush having means for cleaning the upper and lower teeth at the same instant, comprising a plurality of brush units spaced apart when in use consisting of shank portions, extensions integrally formed and outwardly extending from the shank portions for receiving the brush bristles, means for bringing the shank portions into foldable relationship, consisting of suitable hinge elements arranged along the adjacent edges of the shank portions, the extensions to the shank portions being formed in such a manner that when the elements are in unfolded position the brush elements may be readily applied for cleaning purposes to the upper and lower outer walls of the teeth and to the cutting edges when in folded position.

In testimony whereof I affix my signature.

PHILIP JORDAN NOEL.